(12) United States Patent
Hammad et al.

(10) Patent No.: US 8,433,651 B2
(45) Date of Patent: Apr. 30, 2013

(54) MOBILE DEVICE INCLUDING COMPUTER READABLE MEDIUM SUITABLE FOR TAX PROCESSING AND CURRENCY CONVERSION

(75) Inventors: Ayman Hammad, Pleasanton, CA (US); Patrick Faith, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 609 days.

(21) Appl. No.: 12/258,007

(22) Filed: Oct. 24, 2008

(65) Prior Publication Data

US 2009/0112757 A1 Apr. 30, 2009

Related U.S. Application Data

(60) Provisional application No. 60/982,682, filed on Oct. 25, 2007.

(51) Int. Cl.
*G06Q 40/00* (2012.01)
(52) U.S. Cl.
USPC .......... 705/39; 705/35; 705/31; 705/44; 705/1.1
(58) Field of Classification Search ........... 705/1, 39, 705/1.1, 35, 31, 44, 14.26, 19, 26.1; 455/408, 455/414.1, 461; 235/380, 379, 375
See application file for complete search history.

(56) References Cited

U.S. PATENT DOCUMENTS

| | | |
|---|---|---|
| 4,674,041 A | 6/1987 | Lemon et al. |
| 5,305,196 A | 4/1994 | Deaton et al. |
| 5,327,508 A | 7/1994 | Deaton et al. |
| 5,388,165 A | 2/1995 | Deaton et al. |
| 5,430,644 A | 7/1995 | Deaton et al. |
| 5,448,471 A | 9/1995 | Deaton et al. |
| 5,483,444 A | 1/1996 | Heintzeman et al. |
| 5,502,636 A | 3/1996 | Clarke |
| 5,564,073 A | 10/1996 | Takahisa |
| 5,577,266 A | 11/1996 | Takahisa et al. |
| 5,579,537 A | 11/1996 | Takahisa |

(Continued)

FOREIGN PATENT DOCUMENTS

| | | | |
|---|---|---|---|
| WO | WO 00/03328 A1 | | 1/2000 |
| WO | WO 01/54091 | * | 1/2000 |

OTHER PUBLICATIONS

Ray Morgovan; Lecture—"An Intorduction to New Features of Adobe 8.1", San Francisco, CA. Nov. 14, 2008.*
U.S. Appl. No. 10/365,703, Hammad et al.

(Continued)

*Primary Examiner* — John H Holly
(74) *Attorney, Agent, or Firm* — Kilpatrick Townsend & Stockton LLP

(57) ABSTRACT

Systems and methods of converting transactions to a new currency and tax processing based on the location of the mobile communication device. The systems and methods send transaction information including a transaction amount associated with a transaction conducted between a merchant and a consumer at an access device, to a server computer. The server computer determines a location of a mobile communication device operated by the consumer and converts an transaction amount to a currency based on a conversion rate based on the location of the mobile communication device or determines a tax amount based on the transaction amount and based on the location of the mobile communication device. The method also receives the converted transaction amount or the tax amount.

21 Claims, 7 Drawing Sheets

U.S. PATENT DOCUMENTS

| | | | |
|---|---|---|---|
| 5,592,560 | A | 1/1997 | Deaton et al. |
| 5,604,921 | A | 2/1997 | Alanara |
| 5,621,821 | A | 4/1997 | Pearman et al. |
| 5,638,457 | A | 6/1997 | Deaton et al. |
| 5,642,485 | A | 6/1997 | Deaton et al. |
| 5,644,723 | A | 7/1997 | Deaton et al. |
| 5,649,114 | A | 7/1997 | Deaton et al. |
| 5,659,469 | A | 8/1997 | Deaton et al. |
| 5,675,662 | A | 10/1997 | Deaton et al. |
| 5,687,322 | A | 11/1997 | Deaton et al. |
| 5,710,886 | A | 1/1998 | Christensen et al. |
| 5,761,648 | A | 6/1998 | Golden et al. |
| 5,791,991 | A | 8/1998 | Small |
| 5,806,044 | A | 9/1998 | Powell |
| 5,822,735 | A | 10/1998 | DeLapa et al. |
| 5,855,007 | A | 12/1998 | Jovicic et al. |
| 5,870,030 | A | 2/1999 | DeLuca et al. |
| 5,884,277 | A | 3/1999 | Khosla |
| 5,905,246 | A | 5/1999 | Fajkowski |
| 5,907,830 | A | 5/1999 | Engel et al. |
| 5,924,080 | A | 7/1999 | Johnson |
| 5,974,399 | A | 10/1999 | Giuliani |
| 6,002,771 | A | 12/1999 | Nielsen |
| 6,009,411 | A | 12/1999 | Kepecs |
| 6,009,415 | A | 12/1999 | Shurling et al. |
| 6,012,038 | A | 1/2000 | Powell |
| 6,014,634 | A | 1/2000 | Scroggie et al. |
| 6,018,718 | A | 1/2000 | Walker et al. |
| 6,035,280 | A | 3/2000 | Christensen |
| 6,041,309 | A | 3/2000 | Laor |
| 6,049,778 | A | 4/2000 | Walker et al. |
| 6,067,526 | A | 5/2000 | Powell |
| 6,067,529 | A | 5/2000 | Ray et al. |
| 6,076,068 | A | 6/2000 | DeLapa et al. |
| 6,076,069 | A | 6/2000 | Laor |
| 6,076,101 | A | 6/2000 | Kamakura et al. |
| 6,128,599 | A | 10/2000 | Walker et al. |
| 6,185,541 | B1 | 2/2001 | Scroggie et al. |
| 6,237,145 | B1 | 5/2001 | Narasimhan et al. |
| 6,292,786 | B1 | 9/2001 | Deaton et al. |
| 6,307,958 | B1 | 10/2001 | Deaton et al. |
| 6,321,208 | B1 | 11/2001 | Barnett et al. |
| 6,330,543 | B1 | 12/2001 | Kepecs |
| 6,334,108 | B1 | 12/2001 | Deaton et al. |
| 6,336,098 | B1 | 1/2002 | Fortenberry et al. |
| 6,336,099 | B1 | 1/2002 | Barnett et al. |
| 6,351,735 | B1 | 2/2002 | Deaton et al. |
| 6,377,935 | B1 | 4/2002 | Deaton et al. |
| 6,424,949 | B1 | 7/2002 | Deaton et al. |
| 6,424,951 | B1 | 7/2002 | Shurling et al. |
| 6,434,534 | B1 | 8/2002 | Walker et al. |
| 6,470,181 | B1 | 10/2002 | Maxwell |
| 6,505,046 | B1 | 1/2003 | Baker |
| 6,516,302 | B1 | 2/2003 | Deaton et al. |
| 6,600,919 | B1 | 7/2003 | Kawase |
| 6,601,759 | B2 | 8/2003 | Fife et al. |
| 6,609,104 | B1 | 8/2003 | Deaton et al. |
| 6,611,811 | B1 | 8/2003 | Deaton et al. |
| 6,647,257 | B2 | 11/2003 | Owensby |
| 6,647,269 | B2 | 11/2003 | Hendrey et al. |
| 6,684,195 | B1 | 1/2004 | Deaton et al. |
| 6,775,539 | B2 | 8/2004 | Deshpande |
| 6,912,398 | B1 | 6/2005 | Domnitz |
| 7,013,286 | B1 | 3/2006 | Aggarwal et al. |
| 7,025,256 | B1 | 4/2006 | Drummond et al. |
| 7,040,533 | B1 | 5/2006 | Ramachandran |
| 7,055,031 | B2 | 5/2006 | Platt |
| 7,150,393 | B1 | 12/2006 | Drummond et al. |
| 7,201,313 | B1 | 4/2007 | Ramachandran |
| 7,207,477 | B1 | 4/2007 | Ramachandran |
| 2002/0091569 | A1 | 7/2002 | Kitaura |
| 2002/0165775 | A1 | 11/2002 | Tagseth et al. |
| 2002/0198777 | A1 | 12/2002 | Yuasa |
| 2003/0058261 | A1 | 3/2003 | Challa |
| 2003/0144907 | A1 | 7/2003 | Cohen et al. |
| 2003/0212595 | A1 | 11/2003 | Antonucci |
| 2004/0054075 | A1 | 3/2004 | Marshall |
| 2004/0117254 | A1* | 6/2004 | Nemirofsky et al. ............ 705/14 |
| 2004/0254848 | A1 | 12/2004 | Golan et al. |
| 2006/0111967 | A1 | 5/2006 | Forbes |
| 2006/0294004 | A1* | 12/2006 | Burge ............................. 705/39 |
| 2008/0021800 | A1* | 1/2008 | Wilmes et al. .................. 705/31 |

OTHER PUBLICATIONS

U.S. Appl. No. 11/960,162, Ciurea.

* cited by examiner

30(a)

30

```
Merchant ID: 1000
Item       Price           Sku Number
Item 1    $ 60.00            11111
Item 2    $ 50.00            22222
Item 3    $ 40.00            33333
Item 4    $ 50.00            44444
Subtotal  $ 200.0  (CAD)
```

52

|  | Price | Coupon Discount | Apply Coupon | View Coupon |
|---|---|---|---|---|
| Item 1 | $ 60.00 | | | |
| Item 2 | $ 50.00 | $10.00 | ☒ | ☐ |
| Item 3 | $ 40.00 | $5.00 | ☐ | ☐ |
| Item 4 | $ 50.00 | | | |
| Subtotal | $ 190.00 (CAD) | | | |
| Sales Tax | $ 22.80 (CAD) | | | |
| Credit Card Fee | $ 1.00 | | | |
| Total | $ 212.80 (CAD) | | | |
| | $ 227.90 (USD) | Based on Currency Conversion Rate: 1 USD = 1.07135 CAD at 1:00 p.m. EST US | | |

If you want to process transaction, please enter PIN _____

MOBILE DEVICE INCLUDING COMPUTER READABLE MEDIUM SUITABLE FOR TAX PROCESSING AND CURRENCY CONVERSION

CROSS-REFERENCES TO RELATED APPLICATIONS

This patent application claims priority to U.S. Provisional Application No. 60/982,682 filed Oct. 25, 2007, entitled "Mobile Phone Payment System and Method," which is hereby incorporated by reference in its entirety for all purposes.

BACKGROUND

When a consumer traveling abroad makes a purchase with a credit card at a local merchant, the issuer of the credit card converts the amount of the transaction from a local currency into the currency of consumer's account. The foreign exchange rate used to convert the transaction is negotiated by the issuer of the credit card. This foreign exchange rate can be different than the foreign exchange rate currently available at a local bank. The consumer using the credit card in the foreign country does not necessarily know what foreign exchange rate will apply to the transaction until they receive their credit card statement.

Similarly, a consumer making a purchase out of state or in a foreign country may not know what taxes and other fees apply to a transaction before they go to complete the transaction. For example, a consumer making an online purchase may not know where the merchant is located and may not know what taxes could apply until after they enter their credit card information to complete the transaction. In some cases, taxes and fees can be an unexpectedly burdensome.

Embodiments of this disclosure address these and other problems.

SUMMARY

Embodiments of the disclosure relate to methods and systems for correlating tax processing and location, as well as currency conversion.

An embodiment of the disclosure is directed to a method for sending transaction information including a transaction amount associated with a transaction conducted between a merchant and a consumer at an access device to a server computer. The server computer determines a location of a mobile communication device operated by the consumer. The server computer also determines a tax amount based on the transaction amount and based on the location of the mobile communication device or converts the transaction amount to a currency based on a conversion rate based on the location of the mobile communication device. The method also includes receiving the converted transaction amount or the tax amount.

Another embodiment is directed to a computer readable medium that has code for sending transaction information including a transaction amount associated with a transaction conducted between a merchant and a consumer at an access device to a server computer. The server computer determines a location of a mobile communication device operated by the consumer, and converts the transaction amount to a currency based on a conversion rate based on the location of the mobile communication device or determines a tax amount based on the transaction amount and based on the location of the mobile communication device. The computer readable medium also has code for receiving the converted transaction amount or the tax amount.

Another embodiment is directed to a phone having a computer readable medium comprising code for sending transaction information including a transaction amount associated with a transaction conducted between a merchant and a consumer at an access device to a server computer. The server computer determines a location of a mobile communication device operated by the consumer, and determines a tax amount based on the transaction amount and based on the location of the mobile communication device or converts the transaction amount to a currency based on a conversion rate based on the location of the mobile communication device. The computer readable medium also has code for receiving the converted transaction amount or the tax amount. The phone also has a processor in communication with the computer readable medium.

Another embodiment is directed to a method of receiving transaction information including a transaction amount associated with a transaction conducted between a merchant and a consumer at an access device. The method also determines a location of a mobile communication device operated by the consumer. The method also determines a tax amount based on the transaction amount and based on the location of the mobile communication device or converts the transaction amount to a currency based on a conversion rate based on the location of the mobile communication device. The method also sends the converted transaction amount or the tax amount.

These and other embodiments of the disclosure are described in further detail below.

BRIEF DESCRIPTION OF THE DRAWINGS

FIG. 6 is an illustration depicting an exemplary display on a mobile communication device, in accordance with an embodiment of the disclosure.

DETAILED DESCRIPTION

Figure 1:
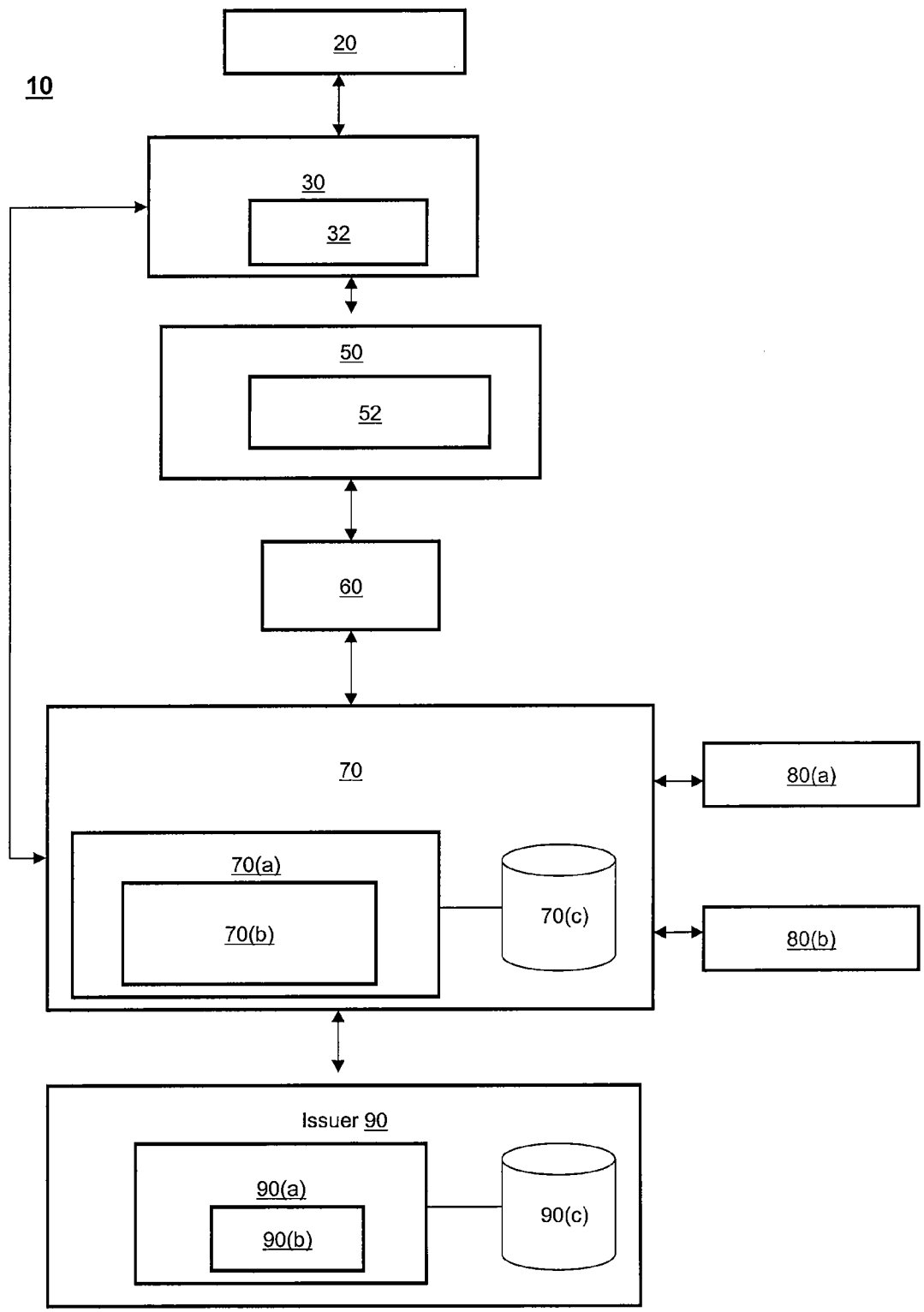
FIG. 1 is a block diagram of an exemplary system for correlating tax processing and location, in accordance with an embodiment of the disclosure.

Embodiments of the disclosure are directed to a method and a system for converting a transaction to a currency and determining taxes based on location. Generally, a consumer initiates a purchase transaction at a merchant. The merchant enters information about the transaction into an access device (e.g., a point-of-sale terminal). The transaction information is sent to a server computer of a payment processing network or an issuer associated with a mobile communication device (e.g., a mobile phone). The server computer determines the location of the mobile communication device operated by the consumer. The server computer uses this location information, a location associated with consumer's account, and the time of the transaction to determine a foreign exchange rate. The server computer uses the foreign exchange rage to convert the amount of the transaction into a currency associated with a consumer's account. The converted amount of the transaction is sent to the consumer on their mobile communication device or to the access device. The server computer also determines the taxes that apply to the transaction by correlating the location of the mobile communication device and the amount of the transaction with applicable tax rules. In addition, the server computer can also deliver secure coupons to the mobile communication device. Once the consumer goes forward with the transaction, the issuer sends a message authorizing the transaction to the merchant to complete the transaction.

Certain embodiments of the disclosure may provide one or more advantages to consumers, merchants, issuers, and others. An advantage to a consumer is that the consumer can make a more informed decision about whether to complete a transaction based on up-to-date information regarding taxes, foreign exchange rates, and secure coupons that could apply to the transaction. In this method and system, the server computer can send information such as the tax amount, the current foreign exchange rate, the converted amount of the transaction, and secure coupons supplied by manufacturers to the consumer before the consumer decides to complete the transaction. The consumer can use this information to make an informed decision on whether to complete the transaction or wait for a more favorable transaction. As a result, the consumer can save money on their purchases.

An advantage to merchants and issuers is that higher profits from sales can result in greater consumer confidence. In this method and system, the consumer is given information that allows them to make a more informed decision on whether to complete a transaction. Since the consumer is making a more informed decision, the consumer's confidence in making purchasing decisions may increase. As a result, the consumer may make more purchases which could result in greater profits to the merchants and issuers.

Certain embodiments of the disclosure may include none, some, or all of the above technical advantages. One or more other technical advantages may be readily apparent to one skilled in the art from the figures, descriptions, and claims included herein.

I. Exemplary System

FIG. 1 is a block diagram of an exemplary system 10 for converting a transaction to a currency and determining taxes based on location, in accordance with an embodiment of the disclosure. System 10 includes a consumer 20 in operative communication with a mobile communication device 30 having a global positioning system (GPS) element 32, or any other suitable position determining device (e.g., a position determining device that can determine position based on the signal strength and the location of the nearest cell tower). System 10 also includes a merchant 50 having an access device 52. Mobile communication device 30 is also in communication with merchant 50. System 10 also includes an acquirer 60 (e.g., a bank) associated with merchant 50.

System 10 also includes a payment processing network 70 having a server computer 70(a) with a computer readable medium (CRM) 70(b), and a database 70(c) in communication with the server computer 70(a). System 10 also includes a manufacturer A 80(a) and a manufacturer B 80(b) that are in communication with payment processing network 70 to provide coupon offers. Although the illustrated embodiment shows two manufacturers 80(a) and 80(b), any suitable number of manufacturers may be present in other embodiments.

System 10 also includes an issuer 90 having an account with consumer 20. Issuer 90 has a server computer 90(a) with a CRM 90(b) and a database 90(c) in communication with server computer 90(a). Issuer 90 is in communication with payment processing network 70. Acquirer 60 is in communication with payment processing network 70 and merchant 60 to receive authorization for the transaction from payment processing network 70 and forward it to merchant 50. Mobile communication device 30 is in communication with payment processing network 70 to send transaction information and to receive information such as the converted amount of a transaction, the current foreign exchange rate, the tax amount, secure coupons, and other suitable information.

"Transaction information" can refer to any suitable information related to the transaction conducted between consumer 20 and merchant 50. Some examples of suitable information include a list of the items in the transaction, a description of the items, item identifiers, product identifiers (e.g., stock keeping units or SKUs), a merchant ID, an access device ID (e.g., POS terminal ID), prices of the items being purchased, the total number of items, the amount of the transaction or transaction amount, a tax amount, a total amount of the transaction after taxes, an electronic signature from merchant 50, a time of the transaction, a location where the transaction is occurring, secure coupons, the currency of the transaction, and other suitable information related to the transaction.

An "initial transaction amount" can refer to the price of the products before taxes and fees are applied. A "tax amount" can refer to the value of the taxes and optionally any fees that apply to the transaction. The "total amount of the transaction after taxes" can refer to the initial transaction amount plus the tax amount. A "secure coupon" can refer to a discount offer from a manufacturer or a merchant of the product. In many cases, the manufacturer or merchant provides the offer without having any information (e.g., identity information) about the consumer 20. In some cases, consumer 20 may need to provide identity information to the manufacturer to be able to redeem the secure coupon.

Consumer 20 may be an individual, or an organization such as a business that is capable of using mobile communication device 30 to conduct a transaction such as a purchase of goods and/or services. Consumer 20 has an account with issuer 90 that is associated with mobile communication device 30.

Mobile communication device 30 refers to any suitable wireless device that allows consumer 20 to conduct transactions with merchant 50 and communicate information with other entities such as payment processing network 70. Some examples of suitable devices include cellular or wireless phones, personal digital assistants (PDAs), pagers, portable computers, and the like. Mobile communication device 30 may be in any suitable form. For example, suitable mobile communication devices can be hand-held and compact so that they can fit into a consumer's wallet and/or pocket (e.g., pocket-sized).

Mobile communication device 30 includes a GPS element 32 that generates GPS data that can be used to determine the geographical location of mobile device 30. Other methods of determining the location of mobile communication device 30 can also be used. For example, the strength of the mobile phone signal can be used to determine the location of mobile communication device 30.

Mobile communication device 30 communicates information to other system entities in any suitable form. Some examples of suitable forms include a short message service (SMS) message such as a text message, a multimedia media message (MMS), a phone call, a voice message, a voicemail message, an instant messaging (IM) message, an email message, etc. In some cases, the system entity receiving the message (e.g., payment processing network 70) may require a PIN before authorizing the transmission for security purposes. Consumer 20 enters the PIN into mobile communicating device 30 or other device communicating with the entity. The PIN is then sent to the entity. Once the entity verifies the PIN, the requesting entity will authorize the transmission of the message. For example, payment processing network 70 may send a request for a PIN, receive the PIN, and verify the PIN before allowing transmission of a message.

In some embodiments, mobile communication device 30 may have specialized software that allow it to interact directly with other system entities. For example, mobile communication device 30 may include translation software that translates transaction information received from access device 52 into a form that can be understood, processed, and transmitted to payment processing network 70. For example, mobile communication device 30 may include optical character recognition software that converts an image taken from a screen on the access device into transaction information that can be transmitted to payment processing network 70.

Merchant 50 can be any suitable entity that conducts transactions with consumer 20 using mobile communication device 30. Some examples of merchants 50 include a department store, a gas station, a drug store, a grocery store, or other suitable business. Merchant 50 may use any suitable method to conduct the transaction. For example, merchant 50 may be an e-commerce business that conducts transactions through the Internet.

Access device 52 can be any suitable device for communicating with merchant 50 and for interacting with mobile communication device 30. Examples of suitable devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. Access device 52 may use any suitable contact or contactless mode of operation to communicate data to and from mobile communication device 30. For example, access device 52 can use a wireless communication mode including near field communication such as Bluetooth, infrared, etc.

Acquirer 60 refers to any suitable entity that has an account with merchant 50. For example, acquirer 60 may be a bank that operates a bank account for merchant 50.

Payment processing network 70 may include data processing subsystems, networks, and operations used to support and deliver authorization services, exception file services, and clearing and settlement services. An exemplary payment processing network 70 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment processing network 70 includes a server computer 70(a). A "server" or "server computer" refers to a powerful computer or cluster of computers. For example, a "server computer" can be a large mainframe, a minicomputer cluster, or a group of servers functioning as a unit. In one example, a "server computer" may be a database server coupled to a Web server (not shown). Payment processing network 70 may use any suitable wired or wireless network, including the Internet.

Server computer 70(a) includes a CRM 70(b). CRM 70(b) comprises code having instructions for performing the functions of server computer 70(a). For example, CRM 70(b) may include code for tax processing, (e.g., determining specific taxes that apply to certain transactions), code for currency conversion, and/or code for determining secure coupons. As another example, CRM 70(b) may include code for receiving information from and transmitting information to mobile communication device 30, acquirer 60, access device 52, manufacturers 80(a) and 80(b), and/or issuer 90. More specifically, CRM 70(b) may include code for converting an initial transaction amount and/or a total transaction amount to a particular currency based on a current currency conversion rate, code for determining a tax amount based on an initial transaction amount and the location of the mobile communication device 30, and code for determining secure coupons from manufacturers. As another example, CRM 70(b) may include code for determining the location of a mobile communication device 30 Server computer 70(a) may also include a processor for executing instructions on the computer readable medium and for performing the functions of server computer 70(a).

Payment processing network 70 also includes a database 70(c) coupled to the server computer 70(a). A "database" can refer to any hardware, software, firmware, or combination of the preceding for storing and facilitating retrieval of information. A "database" may use any of a variety of data structures, arrangements, and compilations to store and facilitate retrieval of information.

Database 70(c) may store any suitable data. For example, database 70(c) stores data that links information associated with the mobile communication device 30 (e.g., phone number) to account numbers and other information associated with the consumer 20. Database 70(c) may also include data that links consumer data (e.g., account numbers) to issuers 90. For example, the database 70(c) may include account numbers associated with credit or debit accounts of a consumer, and these credit or debit account numbers may in turn be linked to various issuers. Database 70(c) may also include data that correlates the merchant ID or access ID to information about merchant 50. Some examples of merchant information include the location of the merchant 50, the name of the merchant 50, the name of the acquirer 60 associated with merchant 50, the currency used by the merchant 50, and other suitable merchant information. In some cases, there may be more than one currency that can be used by merchant 50 and server computer 70(a) selects one of the currencies that is used by merchant 50. For example, a merchant at a border between two countries such as the United States and Canada may accept payment in either U.S. or Canadian dollars.

Database 70(c) may also include any suitable tax rules for calculating the taxes and/or fees that may apply to transactions conducted by consumer 20. Tax rules that apply to a particular transaction are based on the tax jurisdiction of the transaction. A tax jurisdiction refers to a geographical region associated with the transaction. Some suitable tax rules define the criteria for determining the tax jurisdiction associated with the transaction. In many cases, tax jurisdictions may be based on the location of the merchant, the location consumer 20 based on the mobile communication device 30, and/or other suitable location. Other suitable tax rules comprise the taxes and fees that apply in the different tax jurisdictions.

System 10 also includes a manufacturer A 80(a) and a manufacturer B 80(b) in communication with payment processing network 70 to provide information regarding discount offers associated with products in the transaction. A manufacturer refers to an entity that manufactures one or more products.

Issuer 90 refers to any suitable entity that may open and maintain an account (e.g., a debit or credit account) associated with consumer 20. Some examples of issuers may be a bank, a business entity such as a retail store, or a governmental entity. In many cases, issuer 90 may also issue a payment device (e.g., a payment card) to consumer 20. In some embodiments, issuer 90 may also be the acquirer 60.

Issuer 90 includes a server computer 90(*a*) which includes has a computer readable medium (CRM) 90(*b*). CRM 90(*b*) comprises code used to perform the functions of server computer 90(*a*). Server computer 90(*a*) may also include a processor for performing the functions of server computer 90(*a*). Issuer 90 also includes a database 90(*c*) coupled to the server computer 90(*a*). Database 90(*c*) may store any suitable data. Issuer 90 may use any suitable wired or wireless network, including the Internet.

In an exemplary purchase transaction, consumer 20 selects items (e.g., products and/or services) to purchase from merchant 50. Merchant 50 enters the information about the items into access device 52. Access device 52 displays a list of the items in the transaction, the prices of the items, an initial transaction amount, and the total amount of the transaction. The access device 52 may also optionally display a merchant ID or access device ID, along with other transaction information.

Access device 52 can send the transaction information to mobile communication device 30. For example, consumer 20 may use the mobile communication device 30 to interact with access device 52 at merchant 50 to initiate the sending of transaction information from the access device 52 to the mobile communication device 30. For example, the consumer 20 may wave the mobile communication device 30 by the access device 52 or may place the mobile communication device 30 in contact with the access device 52 so that the mobile communication device 30 can receive the transaction information from the mobile communication device 30. As another example, merchant 50 may cause the access device 52 to send the transaction information to the mobile communication device 30 by pressing a button (or actuating some other data entry device) on the access device 52.

After the access device 52 and the mobile communication device 30 interact with each other, the access device 52 transmits the transaction information to mobile communication device 30. Mobile communication device 30 can then relay the transaction information along with other information (e.g., a phone number) associated with the mobile communication device 30 to server computer 70(*a*) of payment processing network 70. In some cases, server computer 70(*a*) will not accept the transmission of information until consumer 20 sends a PIN and the PIN is validated. Server computer 70(*a*) uses the PIN to authenticate the consumer 20. In other cases, access device 52 transmits the transaction information to server computer 70(*a*) through acquirer 60.

Mobile communication device 30 also sends GPS data from its GPS element 32 to server computer 70(*a*) or to a service provider (e.g., a telephone company) that forwards it to server computer 70(*a*). Server computer 70(*a*) determines the location of mobile communication device 30 based on the GPS data.

Server computer 70(*a*) retrieves data from database 70(*c*) that maps information associated with the mobile communication device 30 (e.g., phone number) to the account number and other information associated with the consumer 20. Server computer 70(*a*) uses this mapping data to determine one or more account numbers and other consumer information from the phone number or other information associated with the mobile communication device 30. Server computer 70(*a*) also retrieves data from database 70(*c*) that correlates each account number to the issuer 90 associated with the account. Server computer 70(*a*) uses this data to determine the issuer 90 having an account associated with the mobile communication device 30.

Server computer 70(*a*) also retrieves tax rules from database 70(*c*) or other source and determines which of the tax rules applies to the transaction. In some cases, server computer 70(*a*) first determines the tax jurisdiction associated with the transaction based on the location of the mobile communication device 30, the location of the merchant 50, and/or other suitable location information. For example, server computer 70(*a*) may determine that the tax jurisdiction is California where the GPS data received from the mobile communication device 30 indicates that the mobile communication device 30 is located in California. Next, server computer 70(*a*) determines which of the retrieved tax rules apply to the tax jurisdiction associated with the transaction. Server computer 70(*a*) then determines the tax amount that applies to the transaction based on the tax rules in that tax jurisdiction, the transaction amount, the type of products in the transaction, and other suitable information. Server computer 70(*a*) sends the tax amount to mobile communication device 30 and/or access device 52.

Server computer 70(*a*) also retrieves data from database 70(*c*) that maps the merchant ID or access device ID in the transaction data to information about merchant 50. Server computer 70(*a*) can also use this mapping data to determine the currency used by merchant 50, the location of merchant, and other merchant information. In another embodiment, server computer 70(*a*) can determine the currency associated with the merchant 50 by determining the location of the mobile communication device 30.

Regardless of how the server computer 70(*a*) determines the current currency associated with the merchant 50, the server computer 70(*a*) determines the currency associated with the account of consumer 20 from the account data. For example, the server computer 70(*a*) may determine from the consumer's account number that the consumer's issuer 80(*a*) is located In the United States. If the determined currency associated with the account of the consumer and the determined currency associated with the transaction are different, server computer 70(*a*) determines a conversion rate also called a foreign exchange rate between the two currencies. The conversion rate can be determined based on the currency of merchant 50, the currency associated with consumer's account, and the time of the transaction determined from the transaction data. In some cases, server computer 70(*a*) negotiates the conversion rate with a bank (e.g., with one of the issuers 80(*a*), 80(*b*)). Once server computer 70(*a*) determines the conversion rate, server computer 70(*a*) uses the conversion rate to convert the initial or total transaction amount to the currency of consumer 20. Server computer 70(*a*) sends the converted amount of the transaction and/or the conversion rate to mobile communication device 30 and/or access device 52. If this information is sent to the access device 52, it may be sent through the acquirer 60 and to the merchant 50. If this information is sent to the mobile communication device 30, it may be sent through a mobile carrier without passing through the acquirer 60 or the merchant 50.

Server computer 70(*a*) may also optionally determine offers in the form of secure coupons from manufacturer A 80(*a*) and manufacturer B 80(*b*) of products in the transaction. For example, server computer 70(*a*) may send a request for offers to manufacturers 80(*a*) and 80(*b*) that are associated with products in the transaction. Server computer 70(*a*) may not, however, send information associated with the identity of the consumer 20 to the manufacturers 80(*a*), 80(*b*). In response to the request, the manufacturers 80(*a*) and 80(*b*) may send one or more offers for secure coupons to server computer 70(*a*). Server computer 70(*a*) can store and maintain current offers in database 70(*c*). Once one or more offers are determined, server computer 70(*a*) sends a message to mobile communication device 30 or to the access device 52 (e.g., via the acquirer 50) with the offers.

At some point, consumer 20 operates mobile communication device 30 to view any secure coupons, the tax amount, the initial transaction amount, the total amount of the transaction after taxes, the items in the transaction, and other transaction information. Consumer 20 can operate mobile communication device 30 to select any desired offers and can request that the transaction be completed. Mobile communication device can send any new transaction information to server computer 70(*a*). In response, server computer 70(*a*) sends the new transaction information in an authorization request message to server computer 90(*a*) of issuer 90. Issuer 90 processes the authorization request message and determines whether to authorize or decline the transaction.

Once server computer 90(*a*) of issuer 90 determines whether to authorize or decline the transaction, server computer 90(*a*) sends an authorization response message to server computer 70(*a*) of payment processing network 70 indicating that the transaction is authorized (or is declined). Server computer 70(*a*) sends the authorization response message to acquirer 60. Acquirer 60 forwards the authorization response message to merchant 50. This authorization response message from acquirer 60 may be displayed on access device 52 or may be printed on a receipt. In other cases, server computer 70(*a*) sends the authorization response message to consumer 20 and consumer 20 may provide the authorization response message to merchant 50. In yet other cases, server computer 70(*a*) sends the authorization response message to consumer 20 and to merchant 50. In these cases, merchant 50 may compare this authorization response message with the one that they received from server computer 70(*a*) to authenticate the transaction and/or consumer 20.

In some cases, server computer 70(*a*) at the payment processing network 70 authorizes the transaction on behalf of issuer 90. In these cases, server computer 70(*a*) processes the information received from mobile communication device 30 to determine information about the consumer 20 operating the mobile communication device 30, the issuer 90 having an account associated with the mobile communication device 30, the merchant 60, and the transaction. With this information, server computer 70(*a*) can determine whether to authorize or decline the transaction on behalf of the issuer 90. Server computer 70(*a*) sends the authorization response message to acquirer 60. Acquirer 60 forwards the authorization response message to merchant 50 which forward it to consumer 20. Server computer 70(*a*) may also send a message to server computer 90(*a*) of issuer 90 indicating that the transaction has been authorized on their behalf and including other suitable information required by server computer 90(*a*) to process the transaction.

At the end of the day, a normal clearing and settlement process can be conducted. A clearing process is a process of exchanging financial details between merchant 50 and issuer 90 to facilitate posting to a consumer's account and reconciliation of the consumer's settlement position. Clearing and settlement can occur simultaneously.

In other exemplary purchase transactions of embodiments in this disclosure, instead of transmitting the transaction information from the mobile communication device 30 to the server computer 70(*a*), access device 52 transmits the transaction information directly to server computer 70(*a*) or to acquirer 60 and acquirer 60 forwards it to server computer 70(*a*). Mobile communication device 30 sends GPS data from its GPS element 32 to server computer 70(*a*) or to a service provider (e.g., telephone company) that forwards it to server computer 70(*a*). Server computer 70(*a*) determines the location of mobile communication device 30 based on the GPS data. Server computer 70(*a*) then determines at least one of the initial transaction amount, the tax amount, the total amount of the transaction after taxes, the foreign exchange rate, the converted amount of the transaction, secure coupons that could apply to the transaction, another other suitable transaction data. In some embodiments, once server computer 70(*a*) receives notification that consumer wants to proceed with the transaction, server computer 70(*a*) authorizes (or declines) the transaction or sends the transaction data in an authorization request message to server computer 90(*a*) of issuer 90 to authorize (or decline) the transaction. If server computer 90(*a*) sends their authorization (or declination) in an authorization response message to server computer 70(*a*) and server computer 70(*a*) forwards it to merchant 50 through acquirer 60.

Modifications, additions, or omissions may be made to system 10 without departing from the scope of the disclosure. The components of system 10 may be integrated or separated according to particular needs. For example, although separate functional blocks are shown for an issuer, payment processing network, and acquirer, some entities perform all of these functions and may be included in embodiments of disclosure. Moreover, the operations of system 10 may be performed by more, fewer, or other system modules. Additionally, operations of system 10 may be performed using any suitable logic comprising software, hardware, other logic, or any suitable combination of the preceding.

II. Exemplary Mobile Communication Device

Figure 2:
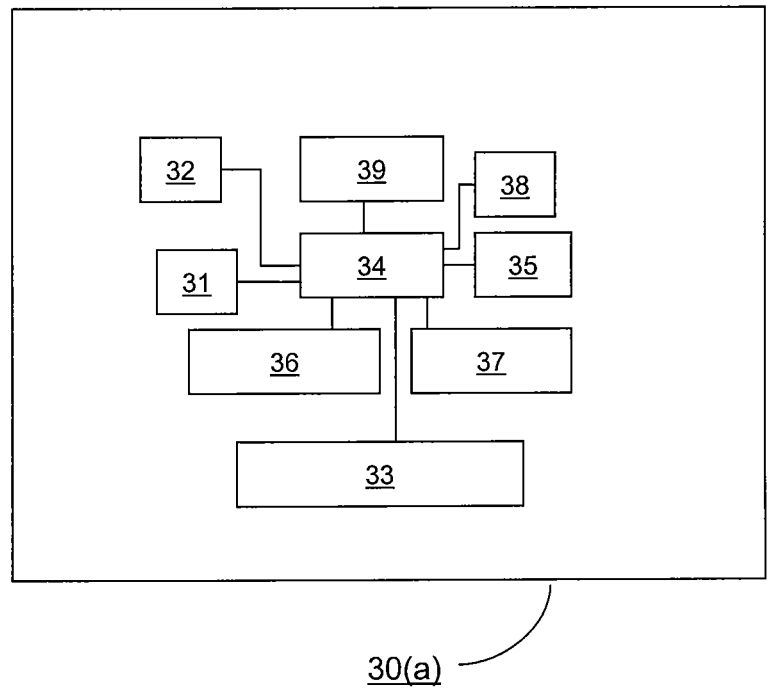
FIG. 2 is a schematic drawing of an exemplary mobile communication device in the form of a mobile phone, in accordance with an embodiment of the disclosure.

FIG. 2 is a schematic drawing of an exemplary mobile communication device 30 (e.g., a mobile phone), in accordance with an embodiment of the disclosure. Exemplary mobile communication device 30 comprises a body 30(*a*) that may be in the form a plastic substrate, housing, or other structure.

Exemplary mobile communication device 30 also comprises a computer readable medium (CRM) 31 that may be present within body 30(*a*), or may be detachable from it. Computer readable medium 31 may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by mobile communication device 30.

Computer readable medium 31 comprises any suitable code for performing the functions of mobile communication device 30. In some embodiments, computer readable medium comprises: a) code for receiving information from access device 52; b) code for sending information to server computer 90(*a*) of issuer 90; c) code for sending information to server computer 70(*a*) of payment processing network 70; d) code for receiving information from server computer 70(a) of payment processing network 70; and/or e) code for receiving information from server computer 90(a) of issuer 90.

Exemplary mobile communication device 30 also includes a contactless element 33, which is typically implemented in the form of a semiconductor chip (or other data storage element) with an associated wireless transfer (e.g., data transmission) element, such as an antenna. Contactless element 33 is associated with (e.g., embedded within) mobile communication device 30 and data or control instructions transmitted via a cellular network may be applied to contactless element 33 by means of a contactless element interface. The contactless element interface functions to permit the exchange of data and/or control instructions between the mobile communication device circuitry (and hence the cellular network) and contactless element 33.

Contactless element 33 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile communication device 30 and an interrogation device. Thus, the mobile communication device 30 is capable of communicating and transferring data and/or control instructions via both cellular network and near field communications capability.

Exemplary mobile communication device 30 also includes a GPS element 32 that generates GPS data that can be used to determine its geographical location. Other types of position determining devices and technologies could be used instead of GPS-based devices and technologies.

The mobile communication device 30 may also include a processor 34 (e.g., a microprocessor) for processing the functions of the mobile communication device 30 and a display 35 to allow a consumer to see phone numbers and other information and messages. The mobile communication device 30 may further include input elements 36 to allow a consumer to input information into the device, a speaker 37 to allow the consumer to hear voice communication, music, etc., and a microphone 38 to allow the consumer to transmit her voice through the mobile communication device 30. The mobile communication device 30 may also include an antenna 39 for wireless data transfer (e.g., data transmission).

Exemplary mobile communication device 30 also comprises a processor 34 (e.g., a microprocessor) for processing the functions of the mobile communication device 30 and a display 35 to display information such as messages and transaction information to viewers such as consumer 20. The mobile communication device 30 may further include input elements 36 to allow consumer 20 to input information into the mobile communication device 30, a speaker 37 to produce sound communications and a microphone 38 for receiving sound communications. The mobile communication device 30 may also include an antenna 39 for wireless data transfer (e.g., data transmission). Computer readable medium 31, GPS element 32, contactless element 33, display 35, input elements 36, speaker 37, microphone 38, and antenna 39 are all operatively coupled to processor 34.

Although FIG. 2 shows a number of components, mobile communication device 30 according to embodiments of the disclosure may comprise any suitable combination or subset of such components.

III. Exemplary Access Device

Figure 3:
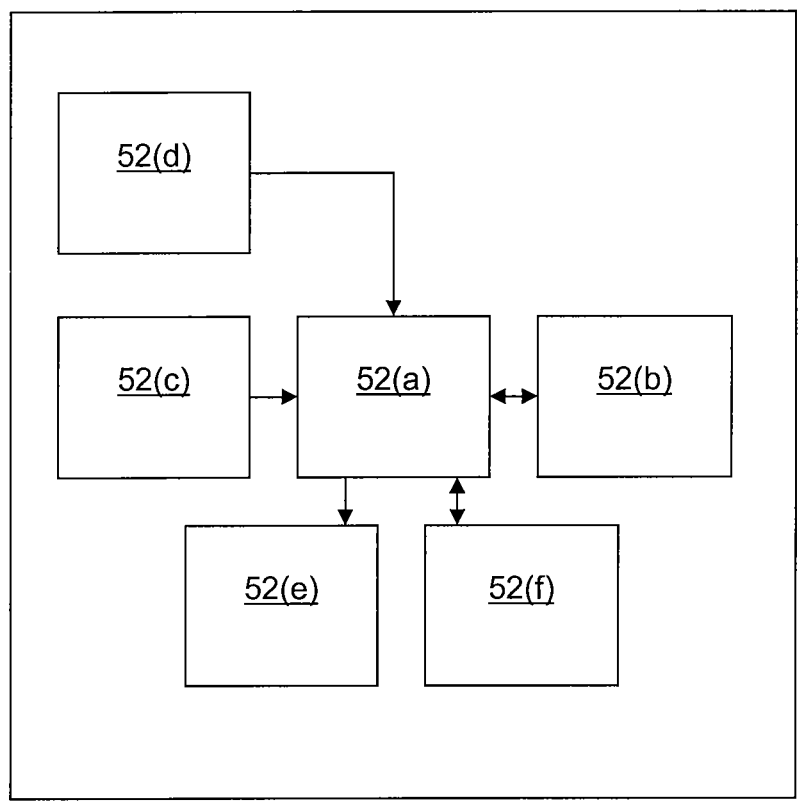
FIG. 3 is a block diagram of the basic components that may reside in an exemplary access device, in accordance with an embodiment of the disclosure.

FIG. 3 is a block diagram of the basic components that may reside in an exemplary access device 52, in accordance with an embodiment of the disclosure. An exemplary access device 52 may comprise a processor 52(a). It may also comprise a computer readable medium 52(b), keypad 52(c), a mobile communication device reader 52(d), an output device 52(e), and a network interface 52(f), all operatively coupled to the processor 52(a). A housing may house one or more of these components. Exemplary mobile communication device readers can include RF (radio frequency) antennas, magnetic stripe readers, etc. that interact with the mobile communication device 30. Suitable output devices may include one or more display displays, audio output devices e.g., speakers and printers. Exemplary computer readable media may include one or more memory chips, disk drives, etc.

Modifications, additions, or omissions may be made to either of the exemplary mobile communication device shown in FIG. 2 or exemplary access device shown in FIG. 3 without departing from the scope of the disclosure. The components of these exemplary devices can be separated according to particular needs. Moreover, the operations of these exemplary devices may be performed by more, fewer, or other components. Additionally, operations of theses exemplary devices may be performed using any suitable logic comprising software, hardware, other logic, or any suitable combination of the preceding.

Figure 4:
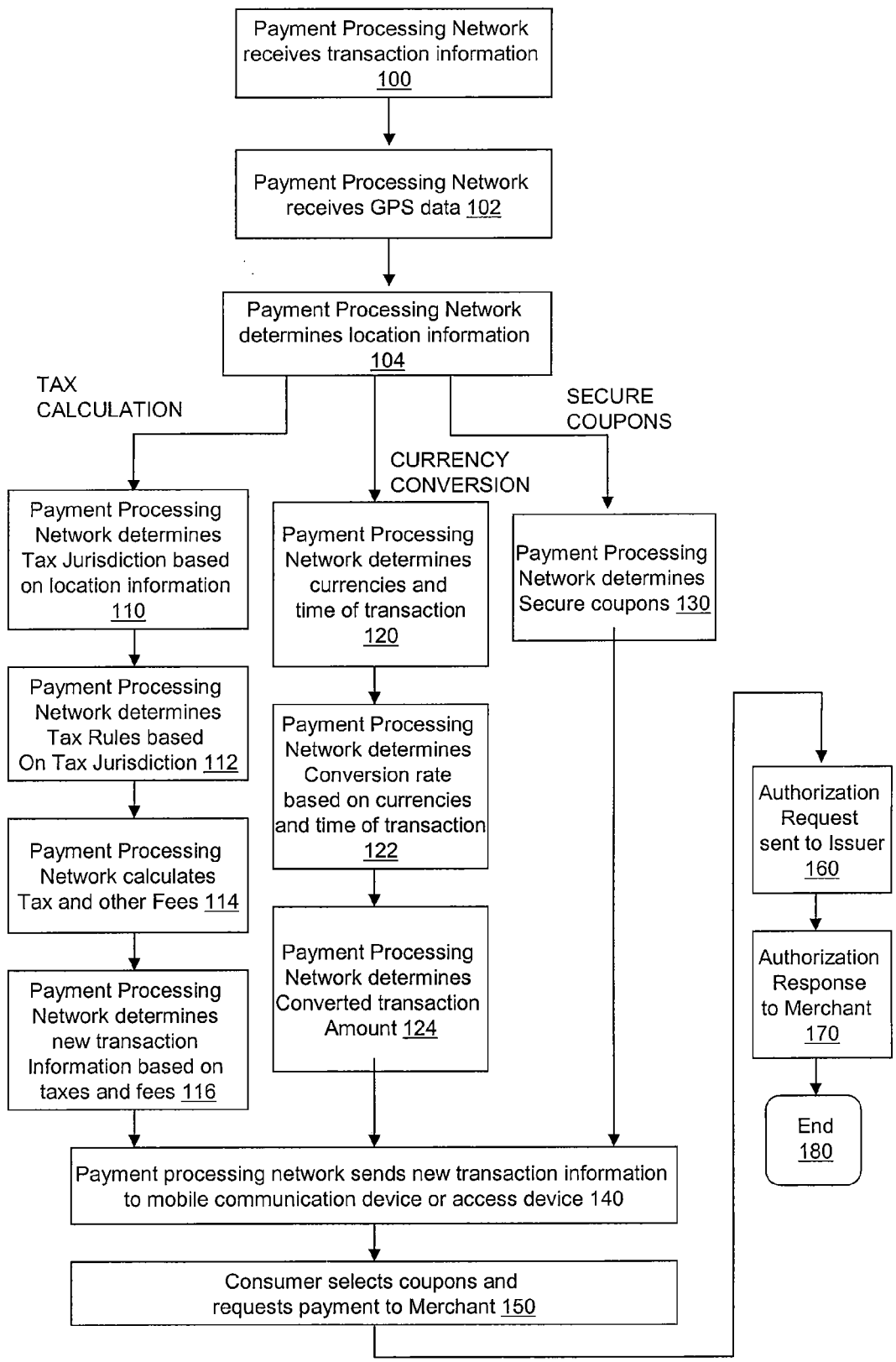
FIG. 4 is a flowchart illustrating a method of correlating tax processing and location, in accordance with an embodiment of the disclosure.

IV. Exemplary Method and a System for Converting a Transaction to a Currency and Determining Taxes Based on Location FIG. 4 is a flowchart illustrating a method and a system for converting a transaction to a currency and determining taxes based on location, in accordance with an embodiment of the disclosure.

The exemplary method begins by server computer 70(a) of payment processing network 70 receiving transaction information (step 100). In some cases, the transaction information is received in a communication (e.g., a SMS message) from mobile communication device 30 operated by consumer 20. In other cases, the transaction information is received in a communication from access device 52 of merchant 50. The transaction information may include any suitable information such as the transaction amount, product identifiers for items in the transaction, the quantity of each product in the transaction, the merchant ID of merchant 50 and/or access device ID associated with merchant 50, the time of the transaction, and other suitable information.

Server computer 70(a) also receives GPS data generated by the GPS element 32 of mobile communication device 30 operated by consumer 20 (step 102). In some cases, server computer 70(a) may receive the GPS data directly from mobile communication device 30 operated by consumer 20. In other cases, a service provider (e.g., telephone company) may send GPS data received from mobile communication device 30 to server computer 70(a).

Server computer 70(a) determines the location of the of the transaction by determining the location of the merchant 50, and/or the location of the mobile communication device 30 (step 104). In some embodiments, the server computer 70(a) determines the location of the transaction by determining the location of the mobile communication device 30 using GPS data. Alternatively or additionally, server computer 70(a) may determine the location of the merchant 50 using mapping information retrieved from database 70(c) of other suitable source of such mapping information. The mapping information correlates the merchant ID or access device ID to the location of the merchant 50. Server computer 70(a) determines the merchant 50 and also the location of the merchant 50 by using the merchant ID and/or access device ID.

If payment processing network 70 is calculating taxes associated with the transaction, server computer 70(*a*) determines the tax jurisdiction associated with the transaction (step 110). In some cases, the tax jurisdiction is based on the location of consumer 20 which is the location of the mobile communication device 30 being operated by consumer 20. In other cases, the tax jurisdiction is based on where the transaction is being conducted. This can be the same as the location of the mobile communication device 30 and the location of the merchant 50. In other cases, the tax jurisdiction could be based on only the location of consumer 20, the location of merchant 50, or the residence of consumer 20, other suitable information. Server computer 70(*a*) may retrieve the residence of consumer 20 from issuer 90.

Server computer 70(*a*) determines the tax rules that apply to the determined tax jurisdiction associated with the transaction (step 112). The tax rules may be retrieved from database 70(*c*), from a tax authority, or other suitable entity. Some tax rules may apply to multiple tax jurisdictions. Other tax rules apply only to certain types of products. For example, server computer 70(*a*) may determine that a sales tax of State X applies to the transaction because the merchant is located in the tax jurisdiction of State X. Server computer 70(*a*) retrieves the tax rules associated with the sales tax of State X from a state government database. The tax rules associated with the sales tax of State X may include a tax rate such as 8.25% and a description of the types of products that are taxable under the sales tax.

Server computer 70(*a*) calculates the tax amount which is the total amount of taxes and fees defined by the tax rules that apply to the transaction (step 114). In the example described above, server computer 70(*a*) determines that only one item in the transaction is a type of product that is taxable under the tax rules associated with the sales tax of State X. Server computer 70(*a*) calculates the tax amount for the taxable item based on the tax rate and the price of the item. Server computer 70(*a*) then calculates the total amount of the transaction after taxes which is the tax amount plus the transaction amount (step 116).

If payment processing network 70 is converting the currency of the transaction, server computer 70(*a*) first determines the currency of merchant 50, the currency of consumer 20, and the time of the transaction (step 120). Server computer 70(*a*) determines the currency of merchant 50 based on the determined location of the merchant 20. Server computer 70(*a*) determines the currency of consumer 20 based on either the location of mobile communication device 30 or from transaction information. Server computer 70(*a*) determines the time of the transaction from the transaction data.

Server computer 70(*a*) determines the conversion rate based on the currencies of merchant 50 and consumer 20, and the time of transaction (step 122). In some cases, issuer 90 provides the conversion rate to sever computer 70(*a*). Server computer 70(*a*) may first send the currencies and the time of the transaction to issuer 90, with a request for the conversion rate. In response, issuer 90 may send the conversion rate to server computer 70(*a*). Server computer 70(*a*) calculates the converted total amount of the transaction based on the current conversion rate determined by server computer 70(*a*) (step 124).

If payment processing network 70 is determining one or more secure coupons, server computer 70(*a*) may determines the secure coupons based on the location of mobile communication device 30 (step 130). For example, the secure coupons can be location based coupons. The secure coupons can be associated with one or more items in the transaction or other items available for purchase at merchant 50. Server computer 70(*a*) may request and receive manufacturer coupons from manufacturer A 80(*a*) and/or manufacturer B 80(*b*). Server computer 70(*a*) may also request and receive coupons from merchant 50, issuer 90, or other suitable entity.

Server computer 70(*a*) sends the transaction information to consumer 20 in a communication to mobile communication device 30 or in a communication to access device 52 (step 140). For example, server computer 70(*a*) may send consumer 20 the total amount of the transaction, the tax amount, the conversion rate, the items in the transaction, the prices of the items in the transaction, and/or the location-based coupons.

Consumer 20 selects coupons to apply to the transaction information and sends a request for payment to merchant 50 that includes the selected coupons (step 150). In some cases, consumer 20 sends the request from their mobile communication device 30 to server computer 70(*a*). In other cases, consumer 20 sends the request using access device 52 and access device 52 forwards the request to server computer 70(*a*).

Server computer 70(*a*) also determines the payment information (e.g., a credit card number) associated with consumer 20. In some cases, consumer 20 sends the payment information in a message sent from mobile communication device 30. In other cases, consumer 20 may provide payment information to access device 52 which is forwarded to server computer 70(*a*) in a communication. In other cases, server computer 70(*a*) may retrieve the payment information from issuer 90.

Server computer 70(*a*) sends an authorization request message to issuer 90 (step 160). Issuer 90 authorizes (or declines) the transaction and sends an authorization response message to server computer 70(*a*). In other cases, server computer 70(*a*) authorizes (or declines) the transaction on behalf of issuer 90.

Server computer 70(*a*) sends the authorization response message to merchant through acquirer 60 indicated that the transaction is authorized (or declined) (step 170) and the method ends (step 180).

In one embodiment, the tax jurisdiction is a duty free zone (e.g., duty free shop) where no taxes apply if consumer 20 is a citizen of another country. In this embodiment, the tax jurisdiction is based on the physical location of consumer 20, the physical location of merchant 50, merchant information, and consumer information. In this embodiment, server computer 70(*a*) verifies that merchant 50 is a duty free shop based on the merchant ID or access device ID from the transaction information. Server computer 70(*a*) determines the location of the merchant 50 based on the merchant ID or access device ID. Server computer 70(*a*) determines the location of the consumer 20 based on the GPS data. Server computer 70(*a*) verifies that the location of consumer 20 and merchant 50 are approximately the same to show that consumer 20 is in the duty free shop of merchant 50. Server computer 70(*a*) also determines the citizenship of consumer 20 based on account information retrieved from issuer 90. Server computer 70(*a*) also verifies that consumer 20 is a citizen of a foreign country from where the merchant's shop is located. Server computer 70(*a*) determines that duty free tax rules apply in this case and determines that no taxes apply to the transaction.

Modifications, additions, or omissions may be made to the method without departing from the scope of the disclosure. The method may include more, fewer, or other steps. Additionally, steps may be performed in any suitable order without departing from the scope of the disclosure.

V. Exemplary Displays on Access Device and Mobile Communication Device

Figure 5:
FIG. 5 is an illustration depicting an exemplary display on a mobile communication device, in accordance with an embodiment of the disclosure.

FIG. 5 is an illustration depicting an exemplary display on an access device 52 at merchant 50, in accordance with an embodiment of the disclosure. The display includes a merchant ID at the top of the display associated with merchant 50. Server computer 70(a) and/or issuer 90 can use merchant ID to identify merchant 50. The display also includes a list of four items, the prices associated with each item, and the SKU number associated with each item. In addition, the display also includes the total amount of the transaction.

Other embodiments of display may include other suitable transaction information associated with the transaction or merchant 50. Some examples of other suitable transaction information include an access device ID.

In addition, other embodiments of display 50 may display transaction information and other information in other ways. For example, a portion of the transaction information on the display may be represented by bar codes. The bar codes can be read by a bar code reader. As another example, a portion of the transaction information on the display may be graphics.

FIG. 6 is an illustration depicting an exemplary display 35 on a mobile communication device 30, in accordance with an embodiment of the disclosure. Display 35 includes a list of four items in the transaction, the prices associated with each item, the location based coupons, the subtotal which is the transaction amount, the tax amount including sales tax and credit card fee that apply to the transaction, the total amount of the transaction after taxes in the merchant's currency, and the total amount of the transaction after taxes in the currency associated with the consumer.

Display 35 also includes a currency conversion rate at the posted time. The currency conversion rate is based on the posted time also displayed. The actual currency conversion rate that will be used for the transaction may be based on the time that the transaction is processed by issuer 90 or other suitable time.

Display 35 also includes the coupon discount amounts for the location based coupons that apply to the items in the transaction. Display 35 also includes options that can be selected to apply the coupons in the transaction or view the coupons. The transaction amount, the tax amount, the total amount of the transaction after taxes, and the converted amount may change on display 35 when consumer 20 applies the coupons.

Display 35 also includes a request for a PIN number. Server computer 70(a) of payment processing network 70 uses this PIN to authenticate consumer 20. Server computer 70(a) may require that consumer 20 enter a PIN before the transmission of the transaction information shown on display 35 will be received by payment processing network 70.

VII. Computer Apparatuses

Figure 7:
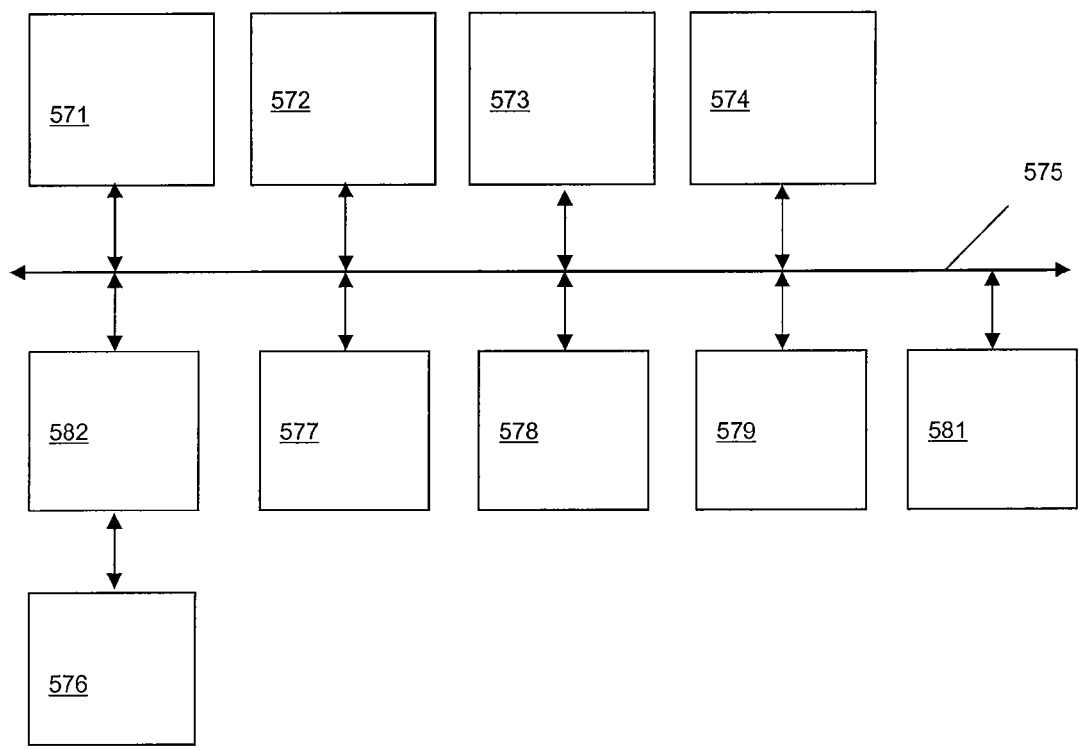
FIG. 7 shows a block diagram of subsystems that may be present in computer apparatuses that are used in the system, according to embodiments of the disclosure.

FIG. 7 shows a block diagram of subsystems that may be present in computer apparatuses that are used in system 10, according to embodiments of the disclosure.

The various participants and elements in the previously described Figures may operate using one or more computer apparatuses to facilitate the functions described herein. Any of the elements in the Figures may use any suitable number of subsystems to facilitate the functions described herein. Examples of such subsystems or components are shown in a FIG. 6. The subsystems shown in FIG. 6 are interconnected via a system bus 575. Additional subsystems such as a printer 574, keyboard 578, fixed disk 579 (or other memory comprising computer readable media), monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 or external interface 581 can be used to connect the computer apparatus to a wide area network such as the Internet, a mouse input device, or a scanner. The interconnection via system bus allows the central processor 573 to communicate with each subsystem and to control the execution of instructions from system memory 572 or the fixed disk 579, as well as the exchange of information between subsystems. The system memory 572 and/or the fixed disk 579 may embody a computer readable medium. Any of these elements may be present in the previously described features. For example, the previously described directory server and access control server may have one or more of these components shown in FIG. 7.

A computer readable medium according to an embodiment of the disclosure may comprise code for performing any of the functions described above. The directory server may also have a processor coupled to the computer readable medium, where the processor executes instructions embodied by computer code on the computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. None is admitted to be prior art.

What is claimed is:

1. A method comprising:
   sending, using a mobile communication device or an access device, transaction information including a transaction amount, a transaction time and a location information associated with a transaction conducted between a merchant and a consumer at the access device, to a server computer, wherein the server computer is configured to perform steps of:

determining, by the server computer, a location of the mobile communication device operated by the consumer, determining, by the server computer, a tax jurisdiction based on the location of the mobile communication device, determining, by the server computer, a set of tax rules that apply to the determined tax jurisdiction associated with the transaction, determining, by the server computer, a tax amount based on the transaction amount and the determined set of tax rules, determining, by the server computer, a total transaction amount based on the tax amount and the transaction amount, and converting, by the server computer, the total transaction amount to a currency based on a conversion rate, wherein the conversion rate is based on the location of the mobile communication device, a location related to an account of the consumer and the time of the transaction;

receiving, by the mobile communication device or the access device, the converted total transaction amount and the tax amount; and displaying, by the mobile communication device or the access device, the received total transaction amount and the tax amount on a display.

2. The method of claim 1, wherein the server computer also converts the tax amount to the currency based on the conversion rate based on the location of the mobile communication device.

3. The method of claim 1, wherein the converted total transaction amount or the tax amount is received at the access device.

4. The method of claim 1, wherein the converted total transaction amount or the tax amount is received at the mobile communication device.

5. The method of claim 1, further comprising receiving the conversion rate at the mobile communication device.

6. The method of claim 1, wherein the server computer is further configured to determine the location of the merchant based on GPS data from the mobile communication device.

7. The method of claim 1, wherein the server computer is further configured to determine a secure coupon associated with items in the transaction.

8. The method of claim 7, further comprising receiving the secure coupon at the mobile communication device.

9. A non-transitory mobile communication device, comprising:

a computer readable medium comprising code for sending transaction information including a transaction amount, a transaction time and a location information associated with a transaction conducted between a merchant and a consumer at an access device, to a server computer, wherein the server computer is configured to:

determine a location of the mobile communication device operated by the consumer, determine a set of tax rules that apply to the determined tax jurisdiction associated with the transaction, determine a tax amount based on the transaction amount and the determined set of tax rules, determine a total transaction amount based on the tax amount and the transaction amount, and convert the total transaction amount to a currency based on a conversion rate, wherein the conversion rate is based on the location of the mobile communication device, a location related to an account of the consumer and the time of the transaction;

code for receiving the converted total transaction amount and the tax amount;

code for displaying the received total transaction amount and the tax amount on a display; and a processor in communication with the computer readable medium.

10. A method comprising:

receiving transaction information including an transaction amount, a transaction time and a location information associated with a transaction conducted between a merchant and a consumer at an access device;

determining, by a server computer, a location of a mobile communication device operated by the consumer;

determining, by the server computer, a tax jurisdiction based on the location of the mobile communication device;

determining, by the server computer, a set of tax rules that apply to the determined tax jurisdiction associated with the transaction;

determining, by the server computer, a tax amount based on the transaction amount and the determined set of tax rules;

determining, by the server computer, a total transaction amount based on the tax amount and the transaction amount;

converting the total transaction amount to a currency based on a conversion rate, wherein the conversion rate is based on the location of the mobile communication device, a location related to an account of the consumer and the time of the transaction; and sending the converted total transaction amount and the tax amount.

11. The method of claim 10, further comprising converting the tax amount to the currency based on the conversion rate based on the location of the mobile communication device.

12. The method of claim 10, wherein the converted total transaction amount or the tax amount is sent to the access device.

13. The method of claim 10, wherein the converted total transaction amount or the tax amount is sent to the mobile communication device.

14. The method of claim 10, further comprising sending the conversion rate to the mobile communication device.

15. The method of claim 10, wherein the location of the mobile communication device is determined based on GPS data from the mobile communication device.

16. The method of claim 1, wherein the server computer is further configured to determine the location of the merchant based on a signal strength and a location of a nearest cell tower.

17. The method of claim 10, wherein the location of the mobile communication device is determined based on a signal strength and a location of a nearest cell tower.

18. The method of claim 1, wherein an issuer that opens and maintains an account associated with the consumer provides the conversion rate to the server computer.

19. The method of claim 8, wherein the secure coupon is based on the location of the mobile communication device.

20. The method of claim 8, wherein the secure coupon is associated with one or more items in the transaction.

21. The method of claim 8, wherein the secure coupon is associated with a product sold by the merchant.

* * * * *